(No Model.)
C. M. HUBBARD.
AUTOMATIC AXLE WASHER.
No. 387,883. Patented Aug. 14, 1888.
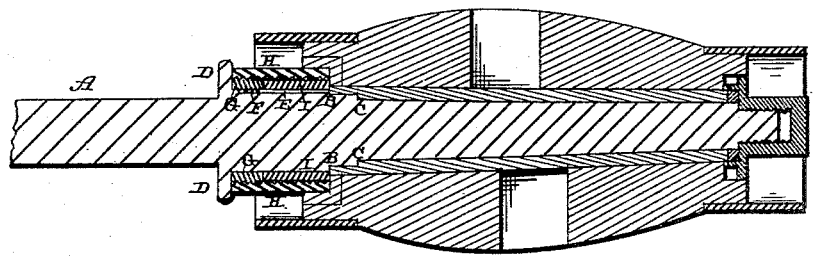
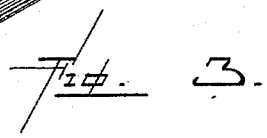
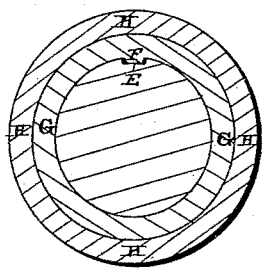

UNITED STATES PATENT OFFICE.

CHARLES M. HUBBARD, OF COLUMBUS, OHIO.

AUTOMATIC AXLE-WASHER.

SPECIFICATION forming part of Letters Patent No. 387,883, dated August 14, 1888.

Application filed February 21, 1888. Serial No. 264,817. (No model.)

*To all whom it may concern:*

Be it known that I, CHARLES M. HUBBARD, of Columbus, in the county of Franklin and State of Ohio, have invented certain new and useful Improvements in Automatic Axle-Washers; and I do hereby declare the following to be a full, clear, and exact description of the invention, such as will enable others skilled in the art to which it pertains to make and use it, reference being had to the accompanying drawings, which form part of this specification.

My invention relates to an improvement in automatic axle-washers; and it consists in the combination of a spindle provided with a shoulder, which acts as a stop to the inward movement of the hub, and which has a longitudinal groove made in its inner end, with a sleeve, which is passed over the spindle and provided on its inner side with a stud or projection to catch in the groove and an external screw-thread, and a washer, which is screwed upon the sleeve, and which abuts against the inner end of the hub and forces it outward against the nut, as will be more fully described hereinafter.

The object of my invention is to place upon the axle inside of each hub a frictional device, which will automatically take up the wear of the hub by forcing out the washer against the end of the hub and prevent rattling.

Figure 1 represents a vertical longitudinal section through the hub and axle. Fig. 2 is a detached view of the spindle, showing its shoulders and groove. Fig. 3 is a vertical section taken at right angles to Fig. 1.

A represents the axle, which is enlarged at its inner end so as to form the shoulder B, which abuts against the inner end of the hub and acts as a stop to prevent its inner movement upon the axle. Between this shoulder B and the outer end of the spindle is formed a second shoulder or enlargement, C, which fits inside of the inner end of the box, as shown, and which also assists in forming a stop to the inward movement of the hub upon the axle and as a means for preventing dirt and grit from working into the box. In the enlarged part of the inner end of the spindle between the shoulder B and the flange D is formed a groove, E, which extends in a line with the length of the spindle, and in which a projection, F, inside of the sleeve G, catches for the purpose of preventing the sleeve from revolving upon the spindle. This sleeve is quite narrow and is screw-threaded externally, so as to allow the box H to be screwed upon it. The box is made considerably wider than the sleeve to admit the washer, and is screw-threaded from one end to the other and bears against the flange D at one end and the inner end of the hub at the other. Between the outer edge of the sleeve and the inner end of the hub is placed a piece of leather or other similar material, I, which serves as a continuous washer and prevents the working of dust or dirt into the hub, and also serves as a support to the inner end of the box where it is not supported by the sleeve.

As above stated, the sleeve has no turning movement upon the spindle or axle, for the reason that it is held stationary by its stud or projection catching in the groove. That end of the box which fits inside of the inner end of the hub has a frictional contact exerted upon it by the turning of the hub while the wheel is in motion. As long as the hub is held between the nut and the washer in such a manner that the wheel can have no lateral movement so as to cause a rattling the box remains stationary upon the sleeve. As soon, however, as the hub, the spindle, the washer, or the nut becomes worn so as to allow the hub a slight lateral play upon the spindle, the frictional contact of the inner end of the hub upon the box causes the box to turn upon the sleeve, and then the thread upon the sleeve causes the sleeve and washer to automatically move outward upon the spindle and thus force the washer outward against the hub. As soon as the hub is held between the nut and the end of the washer all further movement of the box ceases, and the hub is held in such a manner as to prevent rattling. The box then remains in a stationary position until the washer again becomes worn, when the friction of the hub upon the box causes the washer to move out far enough upon the sleeve to take up all wear.

By this construction it will be seen that all wear of the parts is at once automatically taken up at the same time that a sand and dirt box is formed over the inner end of the spindle to prevent grit and dust from working into the box, and avoids or prevents the escape of grease from the inner end of the hub, as is the case in the use of an ordinary washer.

Having thus described my invention, I claim—

1. The combination of the spindle, the nut placed upon its outer end, the hub, a box, a sleeve, and a washer, which is operated by the friction of the hub upon the box, and thus made to automatically take up the wear of the parts, substantially as shown.

2. The combination of the spindle provided with a groove, and a nut placed upon its outer end, with the screw-threaded sleeve provided with a stud or projection, the threaded box, and a washer which is operated by the friction of the hub upon the box, substantially as described.

3. The combination of the spindle provided with the flange D, the shoulder B, and a groove in one side of its inner end, the nut, the hub, the sleeve provided with a stud or projection to catch in the groove, and the washer which moves upon the spindle and is operated by the friction of the hub upon the box, substantially as set forth.

In testimony whereof I affix my signature in presence of two witnesses.

CHARLES M. HUBBARD.

Witnesses:
JOHN J. CHESTER,
C. D. SAVIERS.